US009459713B2

(12) United States Patent
Okumura et al.

(10) Patent No.: US 9,459,713 B2
(45) Date of Patent: Oct. 4, 2016

(54) ELECTRONIC DEVICE HAVING TOUCH SCREEN PANEL, VIBRATION MECHANISMS, AND PERIPHERAL SUPPORT STRUCTURES HAVING DIFFERENT RIGIDITIES

(75) Inventors: Ryo Okumura, Osaka (JP); Yusuke Adachi, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 659 days.

(21) Appl. No.: 13/542,287

(22) Filed: Jul. 5, 2012

(65) Prior Publication Data

US 2013/0009893 A1 Jan. 10, 2013

(30) Foreign Application Priority Data

Jul. 6, 2011 (JP) .................................. 2011-149818
Jun. 25, 2012 (JP) .................................. 2012-141711

(51) Int. Cl.
*G06F 3/041* (2006.01)
*G06F 3/01* (2006.01)

(52) U.S. Cl.
CPC ............... *G06F 3/041* (2013.01); *G06F 3/016* (2013.01); *G06F 2203/04103* (2013.01)

(58) Field of Classification Search
CPC ............... G06F 3/0346; G06F 3/0383; G06F 2203/0381
USPC ........................................ 345/156, 158, 161
See application file for complete search history.

(56) References Cited

U.S. PATENT DOCUMENTS

| 2005/0057527 | A1 | 3/2005 | Takemaka et al. |
| 2005/0180082 | A1 | 8/2005 | Nakamura et al. |
| 2006/0192657 | A1 | 8/2006 | Nishimura et al. |
| 2006/0232564 | A1 | 10/2006 | Nishimura et al. |
| 2007/0080951 | A1* | 4/2007 | Maruyama ............ G06F 1/1626 345/173 |
| 2008/0122315 | A1* | 5/2008 | Maruyama et al. .......... 310/314 |
| 2011/0102341 | A1* | 5/2011 | Imai et al. .................... 345/173 |

FOREIGN PATENT DOCUMENTS

| JP | 2005-092537 A | 4/2005 |
| JP | 2005-228161 A | 8/2005 |
| JP | 2006-215849 A | 8/2006 |
| JP | 2006-227712 A | 8/2006 |
| JP | 2008-123453 A | 5/2008 |
| JP | 2011-096183 A | 5/2011 |
| JP | 2012-181771 A | 9/2012 |

* cited by examiner

*Primary Examiner* — Amare Mengistu
*Assistant Examiner* — Sarvesh J Nadkarni
(74) *Attorney, Agent, or Firm* — Renner, Otto, Boisselle & Sklar, LLP

(57) ABSTRACT

An electronic device includes: a touch screen panel; a support structure having a first support member and a second support member, the first support member and the second support member being in contact with touch screen panel to support the touch screen panel at a periphery of the touch screen panel; a base being in contact with the support structure to support the touch screen panel via the support structure; and a vibration mechanism for vibrating the touch screen panel, the vibration mechanism being provided near the periphery of the touch screen panel so as to be closer to the first support member than to the second support member. The first support member has a rigidity which is greater than a rigidity of the second support member.

18 Claims, 14 Drawing Sheets

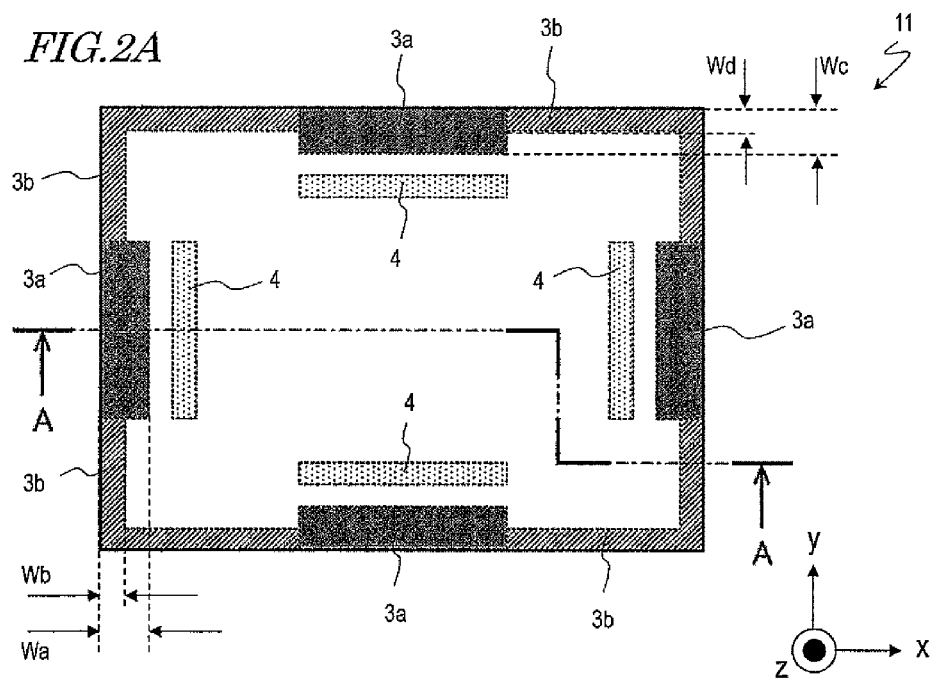
*FIG.2A*
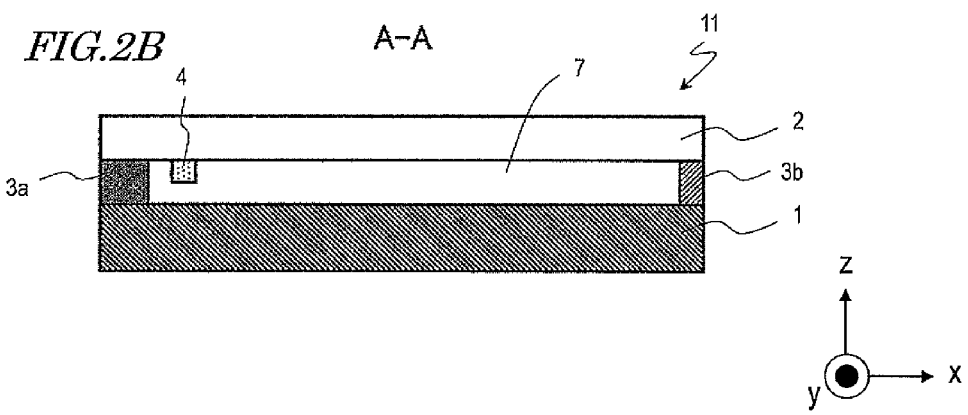
*FIG.2B* A-A

ELECTRONIC DEVICE HAVING TOUCH SCREEN PANEL, VIBRATION MECHANISMS, AND PERIPHERAL SUPPORT STRUCTURES HAVING DIFFERENT RIGIDITIES

BACKGROUND

1. Technical Field

The present disclosure relates to an electronic device having a touch screen panel.

2. Description of the Related Art

Electronic devices having a touch screen panel as an input device on the surface of a display have conventionally been in wide use. One operation principle for such a touch screen panel is an electrostatic method. Under this method, a change in the electrostatic capacity between a fingertip of an operator and an electrically conductive film of the touch screen panel is detected, whereby the position on the panel that is being touched by the operator's fingertip is detected.

Generally speaking, an electronic device having a touch screen panel accepts an input as an operator directly touches on the panel surface. At this time, even if the operator's touch on the panel surface causes a change in electrostatic capacity, the operator has no tactile knowledge of it. Thus, the operator is unable to determine whether an input operation has been properly made by relying on a tactile sensation at his or her fingertip. This fact has imposed substantial stress on the operators of conventional touch screen panels.

Accordingly, Japanese Laid-Open Patent Publication No. 2006-227712 (hereinafter "Patent Document 1") discloses a touch screen panel with a tactile presentation function such that, upon detecting an input operation to a touch screen panel, the touch screen panel is vibrated so as to provide the operator with a tactile feel of operation.

In this touch screen panel with a tactile presentation function, piezoelectric elements for tactile presentation purposes are provided at side edge portions of the touch screen panel. Between the touch screen panel and a stabilization frame, stabilization cushions are disposed at four corners for retaining the touch screen panel while absorbing the vibration of the touch screen panel caused by the piezoelectric elements.

SUMMARY

Upon studying the tactile presentation function of the touch screen panel disclosed in Patent Document 1, the inventors have found that the tactile presentation may not be sufficient, e.g., the operator may feel oddness, or the vibration may not be provided at a sufficient intensity.

One non-limiting and exemplary embodiment disclosed herein is directed to an electronic device having a touch screen panel which can present an improved tactile sensation over the conventional level.

A non-limiting and exemplary electronic device disclosed herein includes a touch screen panel, a support structure, a vibration mechanism, and a base. The support structure has a first support member and a second support member, such that the first support member and the second support member are in contact with the touch screen panel to support the touch screen panel at a periphery thereof. The first support member has a rigidity which is greater than the rigidity of the second support member. The base member is in contact with the support structure to support the touch screen panel via the support structure. The vibration mechanism, which is provided near the periphery of the touch screen panel so as to be closer to the first support member than to the second support member, vibrates the touch screen panel.

In accordance with the non-limiting and exemplary electronic device disclosed herein, inconsistencies in tactile sensation depending on the touched position can be alleviated.

These general and specific aspects may be implemented using a system, a method, and a computer program, and any combination of systems, methods, and computer programs.

Additional benefits and advantages of the disclosed embodiments will be apparent from the specification and Figures. The benefits and/or advantages may be individually provided by the various embodiments and features of the specification and drawings disclosure, and need not all be provided in order to obtain one or more of the same.

BRIEF DESCRIPTION OF THE DRAWINGS

FIG. 2A is an upper plan view of the electronic device of Embodiment 1; and FIG. 2B is a cross-sectional view taken along A-A in FIG. 2A.

FIG. 4 is a cross-sectional view of a first support member 3a.

DETAILED DESCRIPTION

Figure 1:
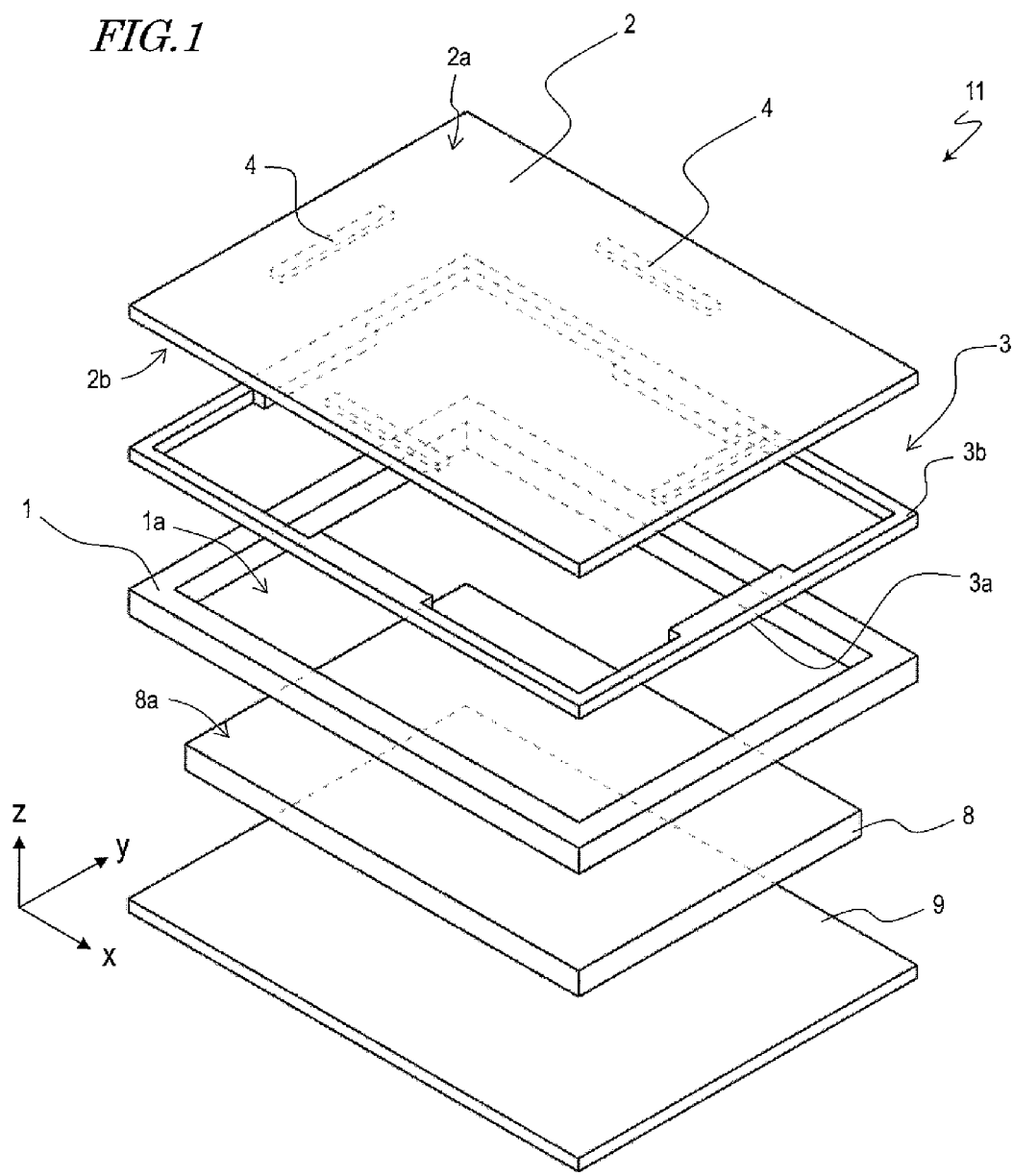
FIG. 1 is an exploded perspective view showing the construction of an electronic device according to Embodiment 1.

The inventors have conducted a detailed study of the causes for the insufficient tactile presentation function of touch screen panels which are provided in conventional electronic devices, such as that of Patent Document 1. As a result, it has been found that in touch screen panels which are provided in conventional electronic devices, an operator may feel oddness for reasons such as fluctuating magnitudes of vibration depending on the position on the panel that is being touched. Moreover, it has also been found that the magnitude of vibration may not be sufficient for satisfactory tactile sensations to be obtained.

In particular, the oddness associated with fluctuating magnitudes of vibration depending on the touched position is presumably caused by the fact that, in the structure disclosed in Patent Document 1, the vibration decreases as the position on the touch screen panel becomes more distant from the piezoelectric elements, while a large vibration is obtained in the vicinity of the piezoelectric elements.

Based on these findings, the inventors have conceived of a new electronic device. Hereinafter, with reference to the figures, embodiments of the inventive electronic device will be described in detail. However, the below-described embodiments are only exemplary, and do not limit the present invention. In the following embodiments, identical component elements may be denoted by identical reference numerals for ease of understanding.

Embodiment 1

Hereinafter, with reference to the figures, an electronic device 11 according to the present embodiment will be described. FIG. 1 is an exploded perspective view schematically showing the construction of the electronic device 11. FIG. 2A is an upper plan view of the electronic device 11. FIG. 2B is a cross-sectional view of the electronic device 11 taken along A-A.

Now, an x direction, a y direction, and a z direction are defined for the sake of explanation. As shown in FIG. 1, the longitudinal direction of the electronic device 11 is defined as the x direction. The lateral direction of the electronic device 11 is defined as the y direction. The thickness direction of the electronic device 11 is defined as the z direction.

Construction

As shown in FIG. 1, the electronic device 11 includes a base 1, a touch screen panel 2, a support structure 3, and vibration mechanisms 4. The electronic device 11 also includes a display device 8 and a control substrate 9, for example.

The base 1 supports the touch screen panel 2. The base 1 is composed of, for example, a metal or resin or the like and has sufficient rigidity for supporting the touch screen panel 2 and the like. Although the base 1 and the support structure 3 are provided as separate elements in the present embodiment, the base 1 and the support structure 3 may be formed as an integral piece.

The display device 8 displays an image on a principal face 8a. The display device 8 is controlled by a control device which is provided on the control substrate 9. Based on the control device, a content is displayed by the display device 8. The base 1 has an opening 1a for an operator to view the content displayed on the display device 8. Although the display device 8 and base 1 are provided as separate elements in the present embodiment, the base 1 may be a portion of the display device 8, for example.

The touch screen panel 2 detects a touch operation of an operator. More specifically, the touch screen panel 2 has a first principal face 2a and a second principal face 2b, and detects a touching of the operator which is made via a finger, a stylus, etc., on the first principal face 2a of the touch screen panel 2 and/or the touched position on the principal face 2a. As the touch screen panel 2, a touch screen panel employing known detection methods such as a pressure-sensitive method, an electrostatic method, an optical method, or a surface acoustic wave method may be used. The touch screen panel 2 may be an On-Cell touch screen panel which adheres to the display panel, or the display panel itself may be an In-Cell touch screen panel having a function of detecting a touch operation. Moreover, the touch screen panel 2 may be transparent or opaque. In other words, any touch screen panel 2 that has the function of detecting a touch operation of an operator will suffice. The touch screen panel 2 is supported by the support structure 3 at its peripheral portion. Although the touch screen panel 2 and the support structure 3 are provided as separate elements in the present embodiment, the touch screen panel 2 and the support structure 3 may be formed as an integral piece.

The support structure 3 is provided in the peripheral portion of the touch screen panel 2, around the entire perimeter, such that the touch screen panel 2 is supported by the base via the support structure 3. The support structure 3 is composed of a material having certain strength and elasticity, e.g., resin, rubber, or gel. The support structure 3 may also be composed of a metal or the like, in which case the strength of the support structure will be enhanced. Moreover, the support structure 3 may be composed of a spring element, in which case the support structure will have a high elastic force. The support structure 3 includes first support members 3a and second support members 3b, such that the first support members 3a and the second support members 3b are in contact with and support the second principal face 2b of the touch screen panel 2. In the present embodiment, the support structure 3 is composed of a single member, and the first support members 3a and the second support members 3b are composed of the same material.

The support structure 3 has four sides, i.e., two opposite shorter sides and two opposite longer sides, so as to conform to the shape of the electronic device 11. Each side of the support structure 3 includes two second support members 3b and a first support member 3a interposed between the two second support members 3b. In the present embodiment, each first support member 3a has a larger width than the width of each second support member 3b. Herein, the width of the support structure 3 is defined along a direction which is parallel to the face of the touch screen panel 2 that is in contact with the support structure 3 and which is perpendicular to the longitudinal direction of the support structure 3.

Specifically, as shown in FIGS. 2A and 2B, along each shorter side of the support structure 3, the y direction defines its longitudinal direction, and thus a width Wa of the first support members 3a along the x direction is greater than a width Wb of the second support members 3b along the x direction. On the other hand, along each longer side of the support structure 3, the x direction defines its longitudinal direction, and thus a width Wc of the first support members 3a along the y direction is greater than a width Wd of the second support members 3b along the y direction. The width Wa and the width Wc do not need to be equal. Similarly, the width Wb and the width Wd do not need to be equal.

In the present embodiment, the first support members 3a and the second support members 3b are composed of the same material. Therefore, the first support members 3a having the greater width possess a higher rigidity than do the second support members 3b. In other words, in the peripheral portion where it is in contact with the touch screen panel 2, the support structure 3 supports the touch screen panel 2 with a greater rigidity at the portions where the first support members 3a are in contact, rather than all at the same rigidity. In the present specification, rigidity refers to the ease of contraction and expansion in a direction which is perpendicular to the face of the support structure 3 that is in contact with the touch screen panel 2.

The vibration mechanisms 4 cause the touch screen panel 2 to vibrate, thus providing the operator with a tactile sensation. As the vibration mechanisms 4, piezoelectric elements, vibration motors, linear actuators, voice coil motors, artificial muscles, and the like are used, for example. In other words, the vibration mechanisms 4 may be anything that can convert an electric energy or the like into a vibrational energy.

The vibration mechanisms 4 are attached to the peripheral portion of the second principal face 2b of the touch screen panel 2. In the present embodiment, the electronic device 11 has four vibration mechanisms 4. One vibration mechanism 4 each is provided near a substantial midpoint of each side of the touch screen panel 2. Furthermore, the vibration mechanisms 4 are disposed at positions which are closer to the first support members 3a than to the second support members 3b.

As the operator uses a finger, a stylus, etc. to designate an arbitrary position on the first principal face 2a, which defines an input plane of the touch screen panel 2, or as the operator moves the finger, stylus, etc., across the first principal face 2a, the touch screen panel 2 outputs a signal which is based on the position, or on the movement of the finger or the like, to the control device that is provided on the control substrate 9. The control device receives the signal from the touch screen panel, and outputs a driving signal which is in accordance with this signal to the vibration mechanisms 4. In the figures, the wiring lines between the touch screen panel, the display device, and the control substrate are omitted for ease of understanding.

As shown in FIG. 2B, a space 7 is formed by the touch screen panel 2, the base 1, and the support structure 3. The vibration mechanisms 4 are installed in the space 7. Other than the support structure 3 and the vibration mechanisms 4, the touch screen panel 2 is not in contact with any structure that may hinder vibration. As a result, through the driving of the vibration mechanisms 4, the touch screen panel 2 is able to vibrate with a sufficient intensity. This causes the touch screen panel 2 to vibrate, thus allowing the operator to have a tactile sensation at his or her finger, or feel the vibration via a stylus.

Effects

As described above, since the vibration mechanisms 4 are disposed closer to the first support members 3a than to the second support members 3b, vibration is easy to propagate to the vicinity of the first support members 3a, which are relatively close to the vibration mechanisms 4, via the touch screen panel 2. On the other hand, since the second support members 3b are farther away from the vibration mechanisms 4 than are the first support members 3a, the second support members 3b suffer from a large decay during propagation through the touch screen panel 2. This would make the vibration propagating to the vicinity of the second support members 3b smaller than the vibration propagating to the vicinity of the first support members 3a. Therefore, in the present embodiment, the rigidity of the first support members 3a is increased over the rigidity of the second support members 3b, as described above. Since the rigidity of the first support members 3a (to which vibration is easy to propagate) is increased, the vibration becomes relatively small in the portions of the touch screen panel 2 near the first support members 3a. On the other hand, since the rigidity of the second support members 3b (to which vibration is less likely to propagate) is reduced, the vibration in the portions of the touch screen panel 2 near the second support members 3b is relatively large compared to the conventional level. Therefore, fluctuations in the magnitude of vibration depending on the position on the touch screen panel 2 supported by the base can be reduced from the conventional level.

Furthermore, the support structure 3 of the present embodiment supports the peripheral portion of the touch screen panel 2 around the entire perimeter. Therefore, water and dust will not intrude between the base 1 and the touch screen panel 2. As a result, an electronic device 11 having excellent waterproofness and dustproofness can be provided.

Furthermore, the support structure 3 of the present embodiment supports the touch screen panel 2 by itself. This makes it possible to obtain desired effects with a small number of parts, thus reducing the number of assembly steps and contributing to the cost reduction of the electronic device.

Embodiment 2

Hereinafter, with reference to the figures, an electronic device 12 according to the present embodiment will be described. In Embodiment 1, the width of the first support members 3a is made larger than the width of the second support members 3b, thus increasing the rigidity of the first support members 3a over the rigidity of the second support members 3b. In the present embodiment, the first and second support members 3a and 3b have an equal width. In the present embodiment, a cross-sectional shape of the first support members 3a and a cross-sectional shape of the second support members 3b are different, unlike in Embodiment 1. Therefore, any members having their counterparts in Embodiment 1 will be denoted by like numerals, and mainly the support structure 3 of the present embodiment will be described.

Construction

Figure 3A:
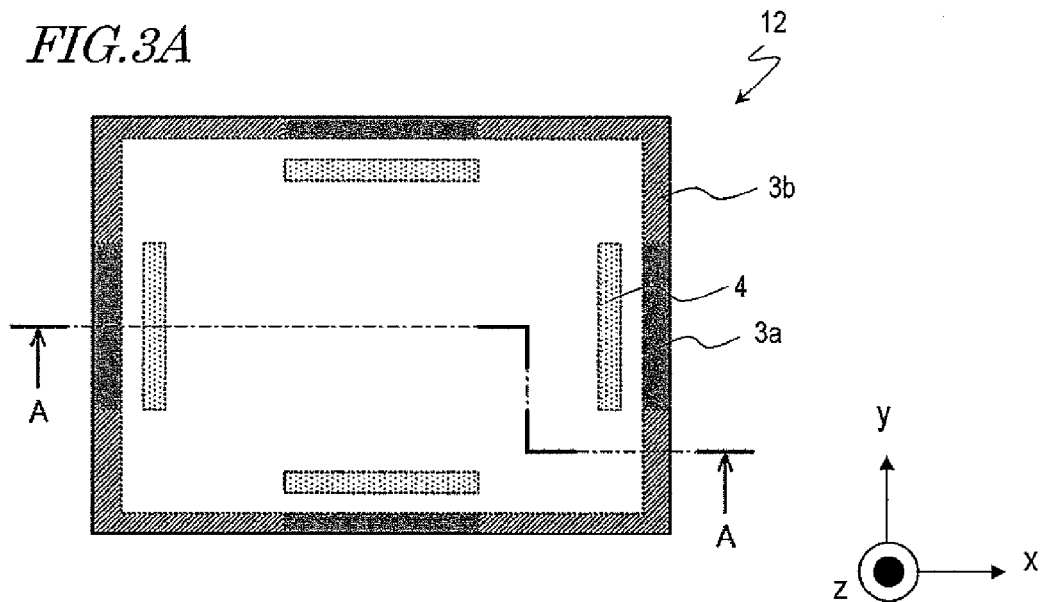
FIG. 3A is an upper plan view of an electronic device according to Embodiment 2.
Figure 3B:
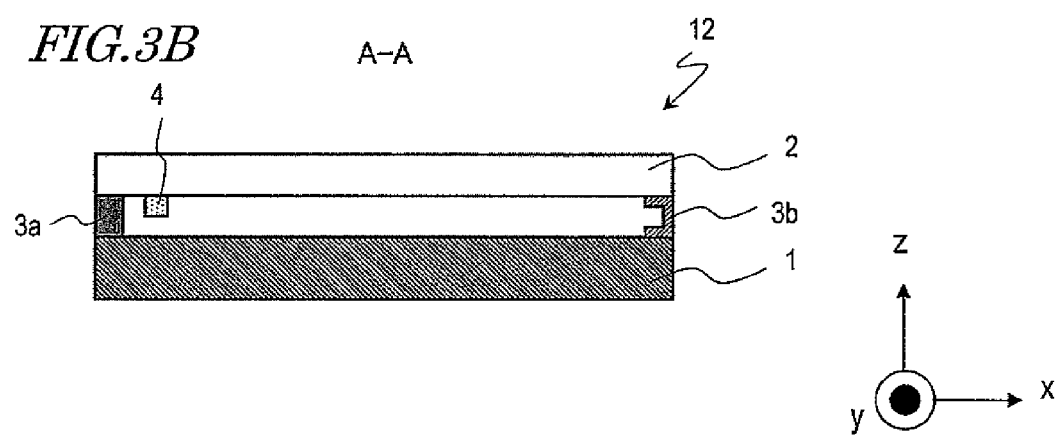
FIG. 3B is a cross-sectional view taken along A-A in FIG. 3A.
Figure 4:
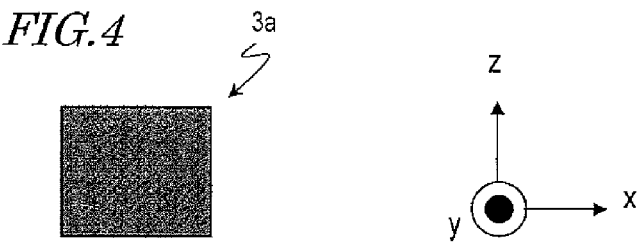

FIG. 3A is an upper plan view of the electronic device 12. FIG. 3B is a cross-sectional view of the electronic device 12 taken along A-A. FIG. 4 is a cross-sectional view of the first support members 3a, taken perpendicular to the longitudinal direction thereof FIGS. 5A to 5F are cross-sectional views of the second support members 3b, taken perpendicular to the longitudinal direction thereof.

As shown in FIG. 3A, the first support members 3a are positioned closer to the vibration mechanisms 4 than are second support members 3b. Moreover, as shown in FIG. 3B, a cross-sectional shape of the first support members 3a in a z-x plane (i.e., a plane which is perpendicular to the longitudinal direction of the shorter sides of the support structure 3) is different from a cross section of the second support members 3b in the z-x plane. Specifically, whereas the cross-sectional shape of the first support members 3a is substantially rectangular as shown in FIG. 4, the cross-sectional shape of the second support members 3b is a inverted "C" shape having a recess 3c, as shown in FIG. 5A.

Under this construction, the rigidity of the first support members 3a is made greater than the rigidity of the second support members 3b. The reason is that each second support member 3b has a reduced width along the x direction in the portion where the recess 3c is provided.

Figure 5A:
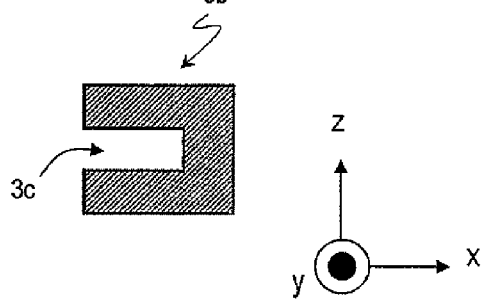
FIGS. 5A to 5F are diagrams showing exemplary cross sections of a second support member 3b.
Figure 5B:
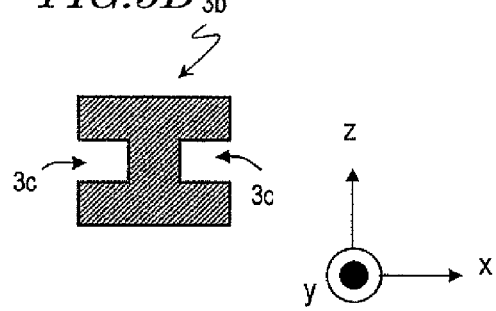
Figure 5C:
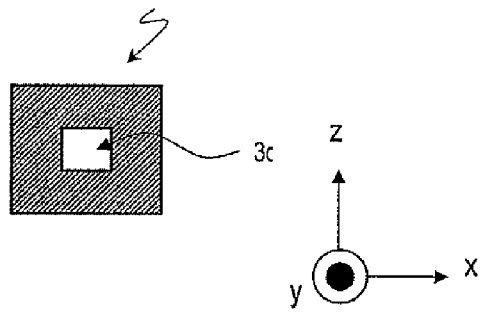
Figure 5D:
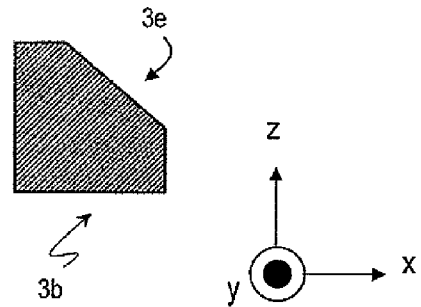
Figure 5E:
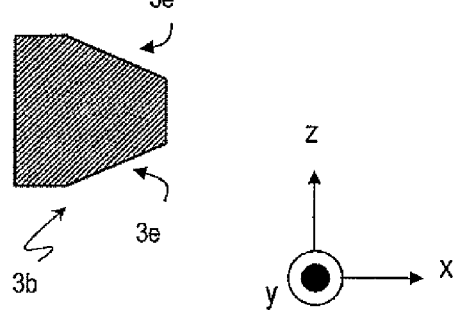
Figure 5F:
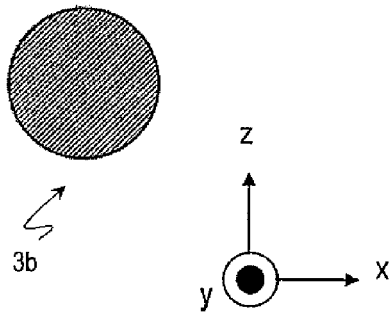

Note that the cross-sectional shape of each second support member 3b is not limited to the inverted "C" shape as shown in FIG. 5A. For example, as shown in FIG. 5B, the cross-sectional shape of each second support member 3b may have a recess 3c in each of the two sides that are adjacent to the side which is in contact with the touch screen panel 2. Alternatively, as shown in FIG. 5C, the cross-sectional shape of each second support member 3b may have a void 3d. In the case where the cross-sectional shape of each second support member 3b is the shape shown in FIG. 5C, the support structure 3 can be formed by first forming the second support members 3b and then allowing the second support members 3b to adhere to the first support members 3a. When forming the second support members 3b, extrusion may be performed by using a mold corresponding to their cross-sectional shape. Alternatively, as shown in FIG. 5D, the cross-sectional shape of each second support member 3b may have a chamfer 3e on its side which is in contact with the touch screen panel 2. Alternatively, as shown in FIG. 5E, the cross-sectional shape of each second support member 3b may have a chamfer 3e on its sides which are in contact with the touch screen panel 2 and the base 1. Alternatively, as shown in FIG. 5F, the cross-sectional shape of each second support member 3b may be a circle. Although not shown, the cross-sectional shape of each second support member 3b may be an ellipse, a polygon, or the like. When a cross section of the second support members 3b taken perpendicular to the longitudinal direction thereof is a shape obtained by removing a portion of the cross section of the first support members 3a taken perpendicular to the longitudinal direction thereof, thus resulting in a reduced cross-sectional area, the second support members 3b attain a rigidity which is smaller than the rigidity of the first support members 3a. In other words, the rigidity of the first support members 3a is greater than the rigidity of the second support members 3b.

Effects

According to the present embodiment, as described above, the rigidity of the first support members 3a is increased over the rigidity of the second support members 3b. Since the rigidity of the first support members 3a (to which vibration is easy to propagate) is increased, the vibration becomes relatively small in the portions of the touch screen panel 2 near the first support members 3a. On the other hand, since the rigidity of the second support members 3b (to which vibration is less likely to propagate) is reduced, the vibration in the portions of the touch screen panel 2 near the second support members 3b is relatively large compared to the conventional level. Therefore, fluctuations in the magnitude of vibration depending on the position on the touch screen panel 2 can be reduced from the conventional level.

Moreover, the fact that the support structure 3 has a constant width makes it easy to obtain a narrow frame according to the present embodiment.

Embodiment 3

Hereinafter, with reference to the figures, an electronic device 13 according to Embodiment 3 will be described. In the present embodiment, the thickness of the first support members 3a along the z direction is different from the thickness of the second support members 3b along the z direction, unlike in Embodiment 1. Therefore, any members having their counterparts in Embodiment 1 will be denoted by like numerals, and mainly the support structure 3 of the present embodiment will be described.

Construction

Figure 6A:
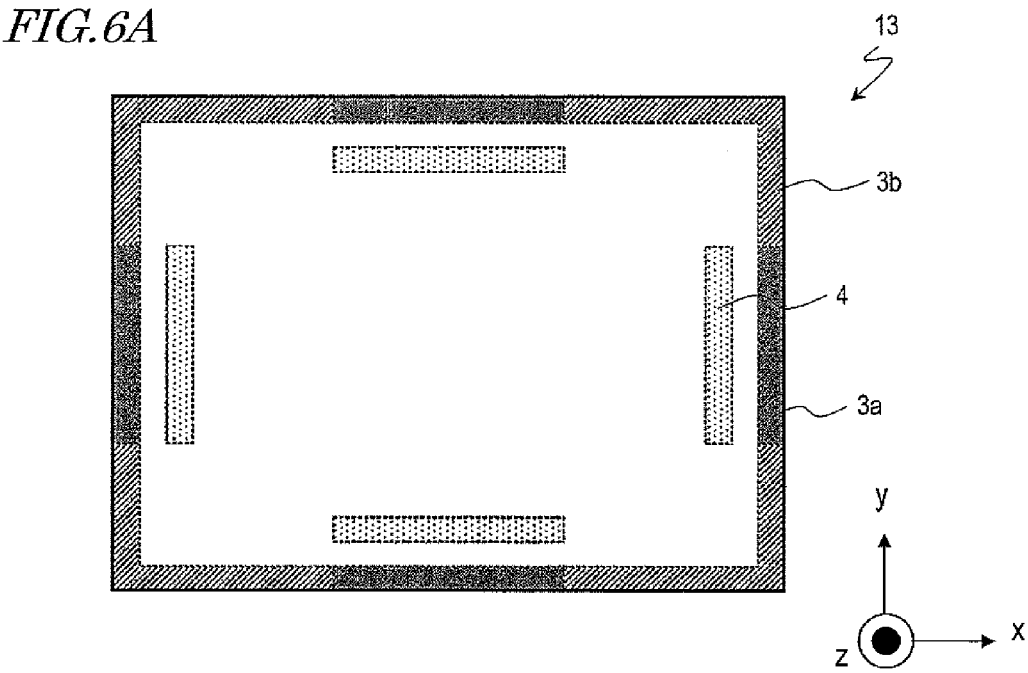
FIG. 6A is an upper plan view of an electronic device according to Embodiment 3.
Figure 6B:
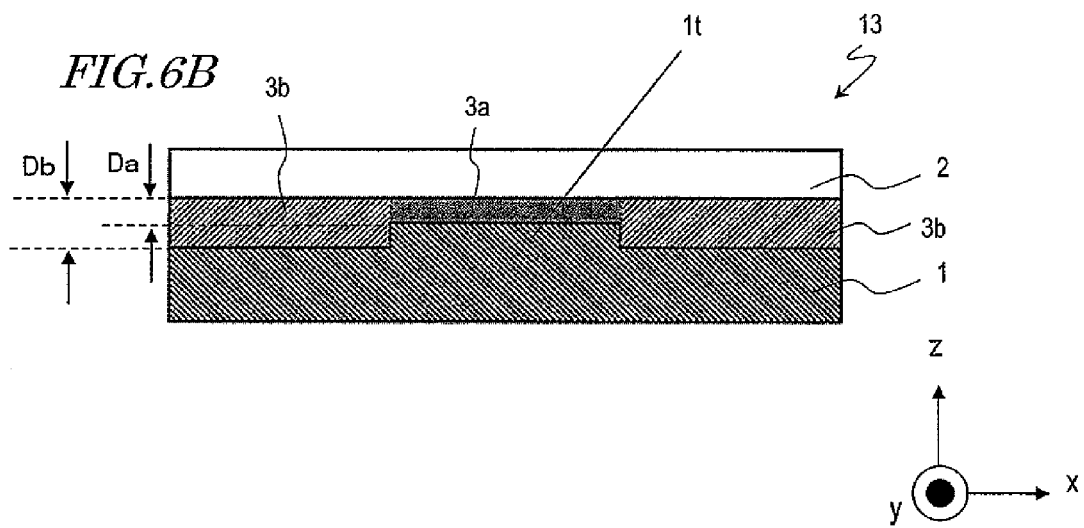
FIG. 6B is a side view of the electronic device of Embodiment 3.

FIG. 6A is an upper plan view of the electronic device 13. FIG. 6B is a side view of the electronic device 13.

As shown in FIG. 6A, the first support members 3a are positioned closer to the vibration mechanisms 4 than are second support members 3b. Moreover, as shown in FIG. 6B, the base 1 of the present embodiment has bumps 1t in regions corresponding to the first support members 3a. As a result, the thickness of the first support members 3a along the z direction, i.e., a direction which is perpendicular to the face of the touch screen panel 2 that is in contact with the first support members 3a, is smaller than the thickness of the second support members 3b along the z direction.

Note that, before being sandwiched between the base 1 and the touch screen panel 2, the thickness Da of the first support members 3a along the z direction and the thickness Db of the second support members 3b along the z direction may be equal. When the support structure 3 becomes sandwiched between the base 1 and the touch screen panel 2, the first support members 3a are compressed by the bumps 1t of the base 1. As a result of this, the thickness of the first support members 3a becomes smaller than the thickness of the second support members 3b. Since the first support members 3a are compressed, they attain a higher rigidity than before compression. This makes the rigidity of the first support members 3a greater than the rigidity of the second support members 3b.

Effects

In the present embodiment, as described above, the rigidity of the first support members 3a is increased over the rigidity of the second support members 3b. Since the rigidity of the first support members 3a (to which vibration is easy to propagate) is increased, the vibration becomes relatively small in the portions of the touch screen panel 2 near the first support members 3a. On the other hand, since the rigidity of the second support members 3b (to which vibration is less likely to propagate) is reduced, the vibration in the portions of the touch screen panel 2 near the second support members 3b is relatively large compared to the conventional level. Therefore, fluctuations in the magnitude of vibration depending on the position on the touch screen panel 2 can be reduced from the conventional level.

Moreover, in the present embodiment, the support structure 3 can be entirely composed of the same material, only in varying thicknesses. Therefore, the support structure 3 can be integrally molded.

Embodiment 4

Hereinafter, an electronic device 14 according to Embodiment 4 will be described. In the present embodiment, the first support members 3a and the second support members 3b are composed of different materials, unlike in Embodiment 1. Therefore, any members having their counterparts in Embodiment 1 will be denoted by like numerals, and mainly the support structure 3 of the present embodiment will be described.

Construction

Figure 7A:
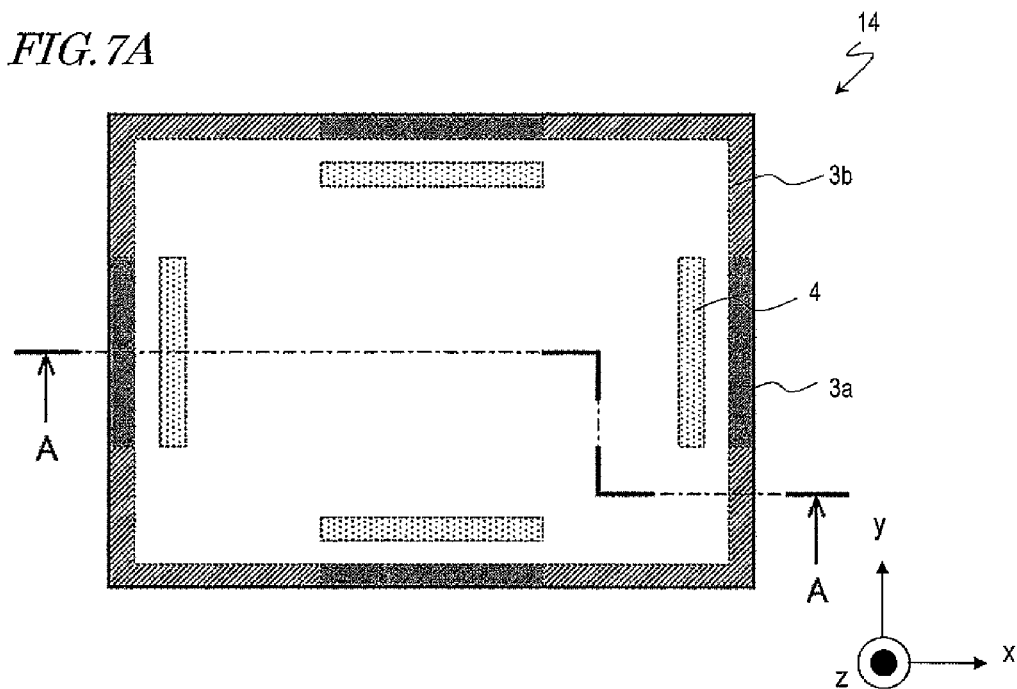
FIG. 7A is an upper plan view of an electronic device according to Embodiment 4.
Figure 7B:
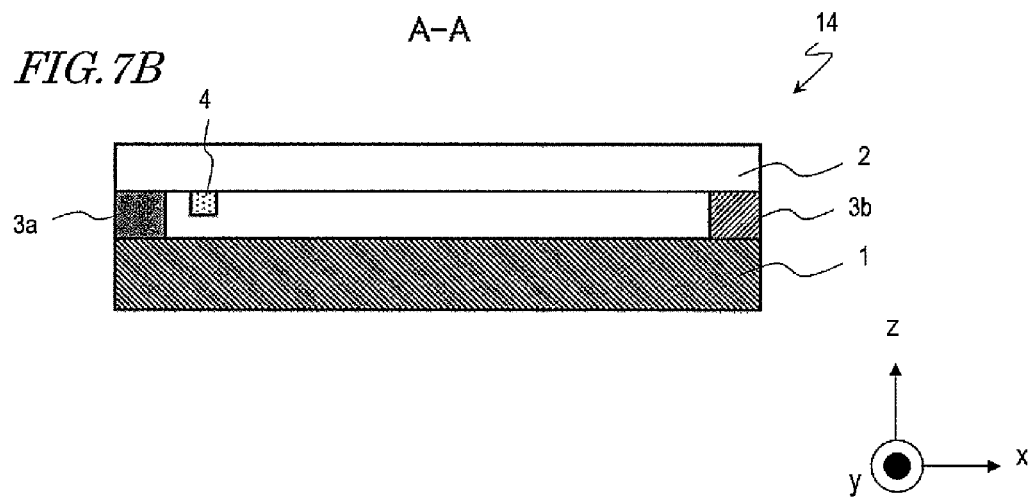
FIG. 7B is a cross-sectional view taken along A-A in FIG. 7A.

FIG. 7A is an upper plan view of the electronic device 14. FIG. 7B is a cross-sectional view of the electronic device 14 taken along A-A.

As shown in FIGS. 7A and 7B, the first support members 3a and second support members 3b have an equal width, an equal thickness, and an equal cross-sectional shape. In the present embodiment, the first support members 3a are composed of a material having a higher rigidity than that of the second support members 3b. Materials having a high rigidity are, specifically, materials having high a Young's modulus or high rubber hardness.

A vibration mechanism 4 is provided near a substantial midpoint of each side of the touch screen panel 2. Also, a first support member 3a is provided near a substantial midpoint of each of the sides defining the support structure 3. In other words, the first support members 3a are disposed closer to the vibration mechanisms 4 than are the second support members 3b.

Effects

In the present embodiment, as described above, the rigidity of the first support members 3a is increased over the rigidity of the second support members 3b. Since the rigidity of the first support members 3a (to which vibration is easy to propagate) is increased, the vibration becomes relatively small in the portions of the touch screen panel 2 near the first support members 3a. On the other hand, since the rigidity of the second support members 3b (to which vibration is less likely to propagate) is reduced, the vibration in the portions of the touch screen panel 2 near the second support members 3b is relatively large compared to the conventional level. Therefore, fluctuations in the magnitude of vibration depending on the position on the touch screen panel 2 can be reduced from the conventional level.

Moreover, in the present embodiment, materials of different rigidities are used. If the material having the lower rigidity (e.g., gel) is more expensive than the material having the higher rigidity (e.g., silicone rubber), for example, the production cost can be reduced by using silicone rubber in portions which may suitably have a high rigidity, as compared to using a gel to provide support around the entire perimeter, which would result in a high material cost.

Embodiment 5

Hereinafter, with reference to the figures, an electronic device 15 according to Embodiment 5 will be described. In Embodiment 1, the support structure 3 is composed of a single member, and the touch screen panel 2 is supported around the entire perimeter. In the present embodiment, the support structure 3 is provided in discrete portions, unlike in Embodiment 1.

Construction

Figure 8A:
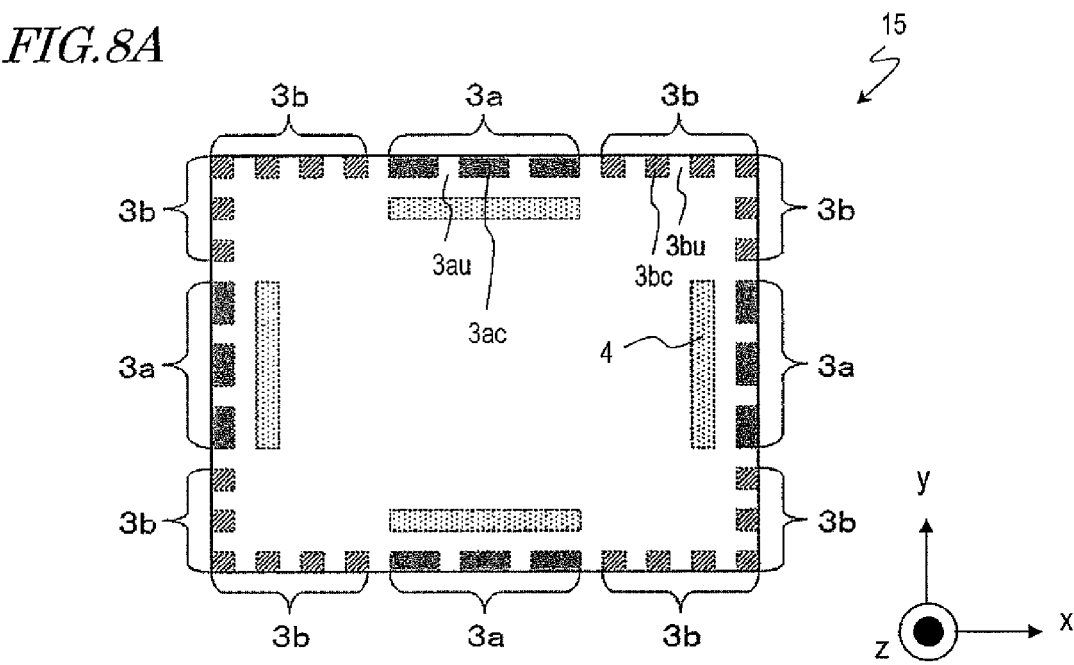
FIG. 8A is an upper plan view of an electronic device according to Embodiment 5.
Figure 8B:
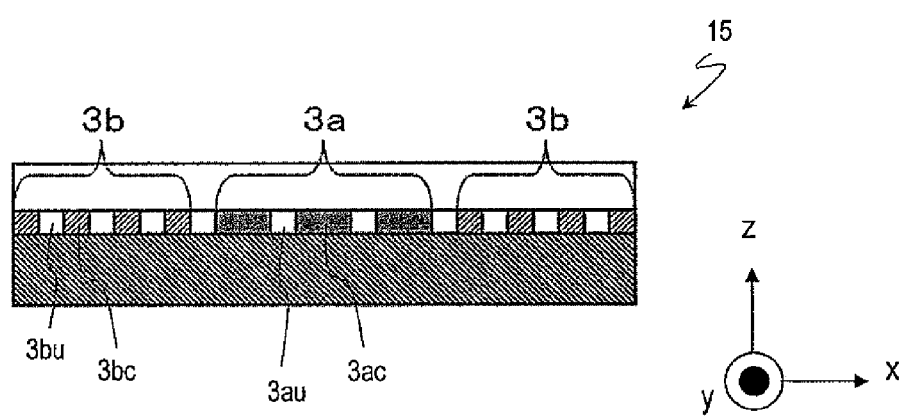
FIG. 8B is a side view of the electronic device of Embodiment 5.
Figure 8C:
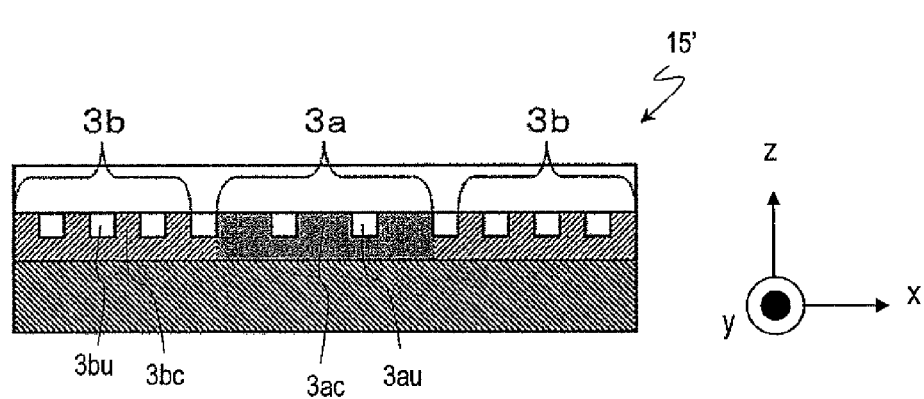
FIG. 8C is a side view showing another example of the electronic device of Embodiment 5.

FIG. 8A is an upper plan view of the electronic device 15. FIG. 8B is a side view of the electronic device 15. FIG. 8C is a side view showing another example of the electronic device 15.

The support structure 3 includes first support members 3a and second support members 3b. The first support members 3a and the second support members 3b each have contacting regions and non-contacting regions. A contacting region is a region where some support member material exists which is in contact with the touch screen panel 2 and the base 1. A non-contacting region is a region which is not in contact with the touch screen panel 2 or the base 1. In the embodiment shown in FIG. 8B, no support member material is provided in the non-contacting regions.

More specifically, each first support member 3a has at least one first non-contacting region 3au which is not in contact with the touch screen panel 2, and a plurality of first contacting regions 3ac which are spaced apart by the first non-contacting region(s) 3au along the longitudinal direction, and which are in contact with the touch screen panel 2. The plurality of first contacting regions 3ac mutually have an equal length along the longitudinal direction of the first support members 3a. In the case where two or more first non-contacting regions 3au exist, too, the lengths of the plurality of first non-contacting regions 3au along the longitudinal direction of the first support members 3a are mutually equal.

Similarly, each second support member 3b has at least one second non-contacting region 3bu which is not in contact with the touch screen panel 2, and a plurality of second contacting regions 3bc which are spaced apart by the second non-contacting region(s) 3bu along the longitudinal direction, and which are in contact with the touch screen panel 2. The plurality of second contacting regions 3bc mutually have an equal length along the longitudinal direction of the second support members 3b. In the case where two or more second non-contacting regions 3bu exist, too, the lengths of the plurality of second non-contacting regions 3bu along the longitudinal direction of the second support members 3b are mutually equal.

It is assumed that, along the longitudinal direction of the first support members 3a, the total length of the plurality of first contacting regions 3ac is L1, and the (total) length of the at least one first non-contacting region 3au is L2. It is also assumed that, along the longitudinal direction of the second support members 3b, the total length of the plurality of second contacting regions 3bc is L3, and the (total) length of the at least one second non-contacting region 3bu is L4. Then, L1, L2, L3, and L4 satisfy the following relationship.

$$L1/L2 > L3/L4 \qquad (1)$$

In eq. (1) above, the left-hand side "L1/L2" represents a ratio between the first contacting regions (3ac) and the first non-contacting region(s) (3au) in each first support member 3a. In eq. (1) above, the right-hand side "L3/L4" represents a ratio between the second contacting region (3bc) and the second non-contacting region(s) (3bu) in each second support member 3b. In each support region, the rigidity of that support region increases as the region that is in contact with the touch screen panel 2 increases in length. Therefore, when eq. (1) above is satisfied, the rigidity of the first support members 3a is greater than the rigidity of the second support members 3b.

Effects

In the present embodiment, as described above, the rigidity of the first support members 3a is increased over the rigidity of the second support members 3b. Since the rigidity of the first support members 3a (to which vibration is easy to propagate) is increased, the vibration becomes relatively small in the portions of the touch screen panel 2 near the first support members 3a. On the other hand, since the rigidity of the second support members 3b (to which vibration is less likely to propagate) is reduced, the vibration in the portions of the touch screen panel 2 near the second support members 3b is relatively large compared to the conventional level. Therefore, fluctuations in the magnitude of vibration depending on the position on the touch screen panel 2 can be reduced from the conventional level.

Note that, as shown in FIG. 8C, the support structure 3 may be shaped so as to be continuous at the base 1 side but discrete at the touch screen panel 2 side. Conversely, the support structure 3 may be shaped so as to be continuous at the touch screen panel 2 but discrete at the base 1 side. With such constructions, too, effects similar to those in FIG. 8B can be obtained so long as the first support members 3a and the second support members 3b satisfy eq. (1) above.

Moreover, in the present embodiment, since contacting regions and non-contacting regions exist in the support structure 3, the amount of material used for the support structure 3 can be reduced. As a result, the entire electronic device can be made light weight, and cost reduction is also possible.

Embodiment 6

Hereinafter, with reference to the figures, an electronic device 16 according to Embodiment 6 will be described. In Embodiment 1, the support structure supports the touch screen panel as the touch screen panel is stacked upon the support structure. In the present embodiment, the support structure has dents for engaging with the touch screen panel, such that the touch screen panel is supported at the dents, unlike in Embodiment 1.

Construction

Figure 9A:
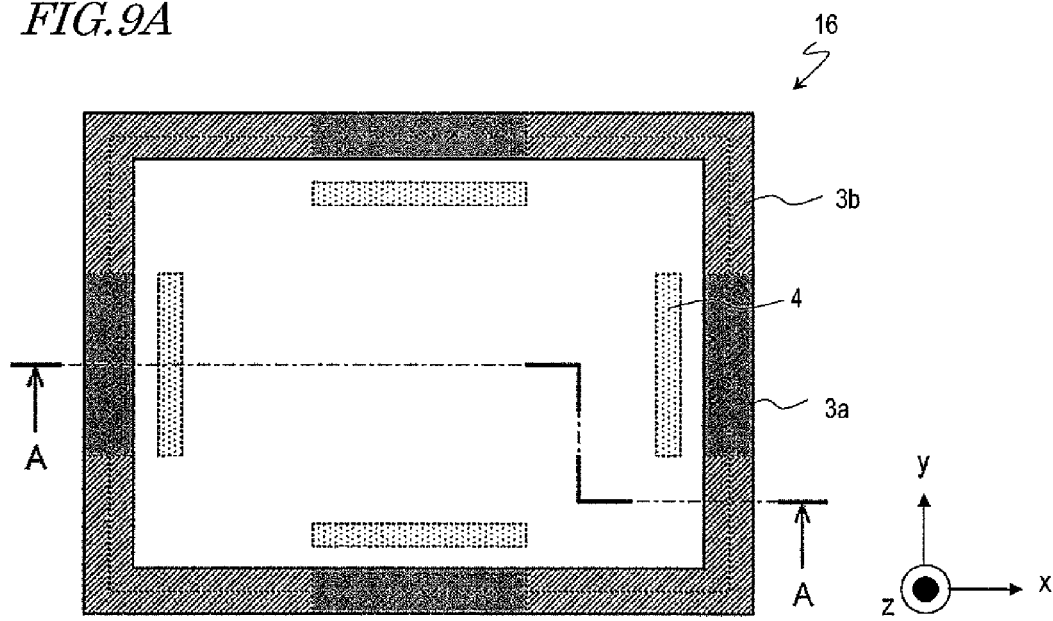
FIG. 9A is an upper plan view of an electronic device according to Embodiment 6.
Figure 9B:
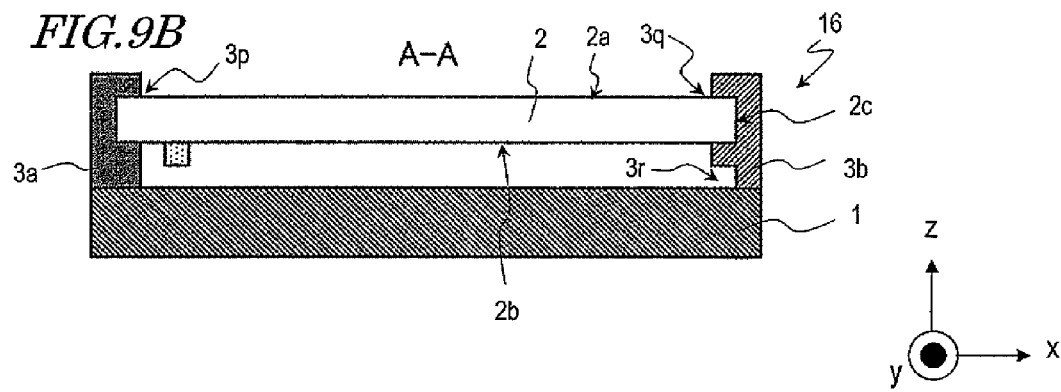
FIG. 9B is a cross-sectional view taken along A-A in FIG. 9A.

FIG. 9A is an upper plan view of the electronic device 16. FIG. 9B is a cross-sectional view of the electronic device 16 taken along A-A.

The support structure 3 includes first support members 3a and second support members 3b. The first support members 3a are formed of a component having a higher rigidity than that of the second support members 3b. Each first support member 3a has a dent 3p for engaging with the touch screen panel 2 at its inner periphery. Each second support member 3b has a dent 3q for engaging with the touch screen panel 2 at its inner periphery. The touch screen panel 2 is supported by the support structure 3 as the touch screen panel 2 is fitted in the dents 3p and dents 3q. In other words, the first support members 3a and the second support members 3b are in contact with the a first principal face 2a, a side face 2c, and a second principal face 2b of the touch screen panel 2 at the periphery of the touch screen panel 2.

Moreover, each second support member 3b has a recess 3r at the base 1 side. Under this construction, the rigidity of the first support members 3a is greater than the rigidity of the second support members 3b.

Effects

In the present embodiment, as described above, the rigidity of the first support members 3a is increased over the rigidity of the second support members 3b. Since the rigidity of the first support members 3a (to which vibration is easy to propagate) is increased, the vibration becomes relatively small in the portions of the touch screen panel 2 near the first support members 3a. On the other hand, since the rigidity of the second support members 3b (to which vibration is less likely to propagate) is reduced, the vibration in the portions of the touch screen panel 2 near the second support members 3b is relatively large compared to the conventional level. Therefore, fluctuations in the magnitude of vibration depending on the position on the touch screen panel 2 can be reduced from the conventional level.

Moreover, in the present embodiment, there is no need to use an adhesive, a double-sided tape, or the like when fixing the support structure 3 and the touch screen panel 2, so that the lead time in the production steps can be reduced. Moreover, since the support structure 3 and the touch screen panel 2 can be easily taken apart, repair, rebuilding, and the like can be easily done.

Embodiment 7

Hereinafter, with reference to the figures, an electronic device 17 according to Embodiment 7 will be described. The present embodiment employs a vibration mechanism 4 having a different shape from Embodiment 1.

Construction

Figure 10A:
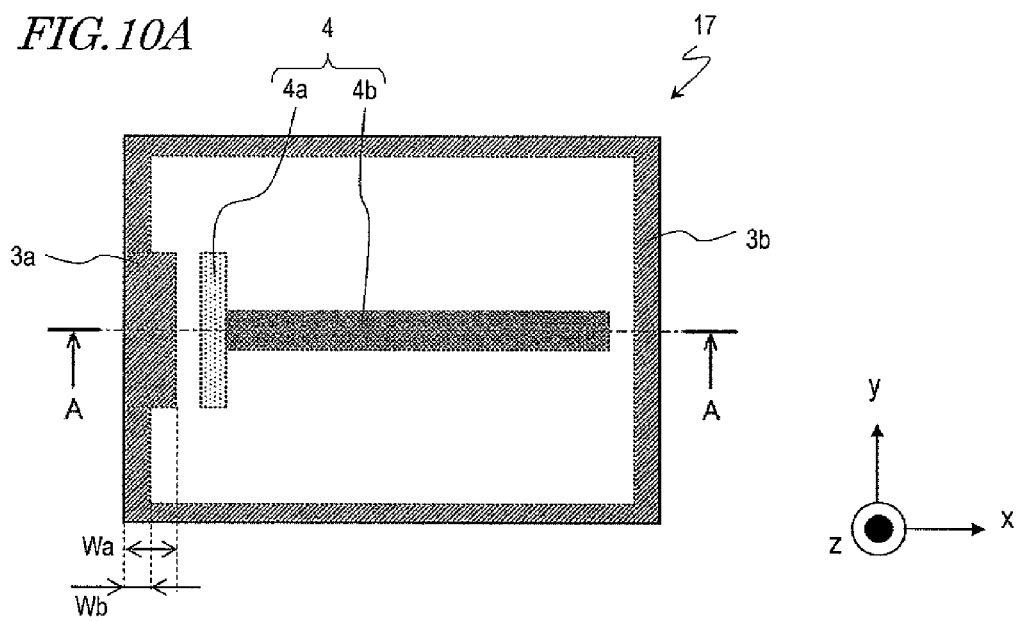
FIG. 10A is an upper plan view of an electronic device according to Embodiment 7.
Figure 10B:
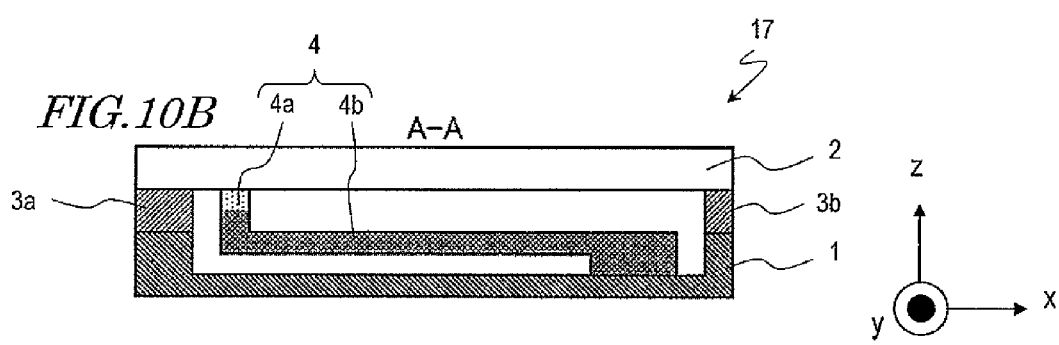
FIGS. 10B to 10D are diagrams each showing an exemplary cross section taken along A-A in FIG. 10A.
Figure 10C:
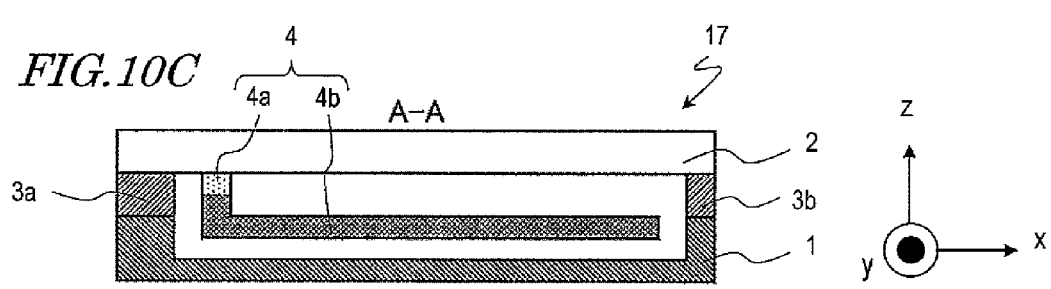
Figure 10D:
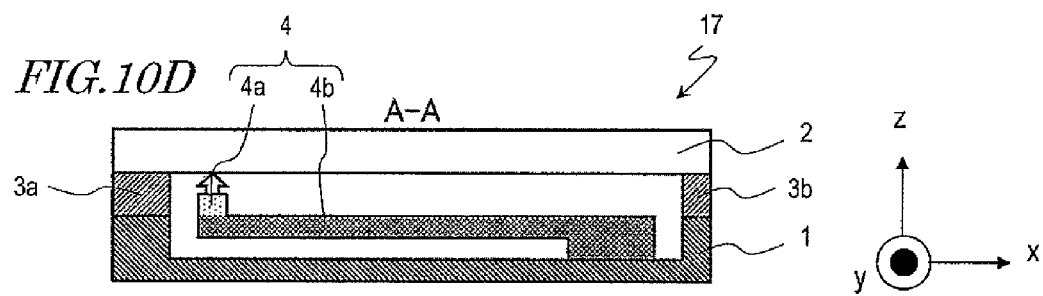

FIG. 10A is an upper plan view of the electronic device 17. FIGS. 10B to 10D are cross-sectional views of the electronic device 17 taken along A-A, showing various shapes for the vibration mechanism 4. A first support member 3a is positioned closer to the vibration mechanism 4 than is the second support member 3b.

The vibration mechanism 4 of the present embodiment includes a section 4a which is in contact with the touch screen panel 2, and a section 4b which is not in contact with the touch screen panel 2. The section 4b not being in contact with the touch screen panel 2 is a vibration source for the vibration mechanism 4, for example. The section 4a being in contact with the touch screen panel 2 is a vibration propagating member which transmits vibration to the touch screen panel 2, for example.

The section 4b not being in contact with the touch screen panel 2 is fixed to the base 1 as shown in FIG. 10B, for example. In other words, in the vibration mechanism 4 of FIG. 10B, a portion which is fixed to the base 1 and a portion which applies vibration to the touch screen panel 2 exist in different positions. For example, if the positioning of a circuit board or any other parts not shown makes it difficult for the vibration mechanism 4 to be fixed to the touch screen panel 2, adopting the construction shown in FIG. 10B for the vibration mechanism 4 allows the vibration mechanism 4 to be efficiently disposed while saving space.

Moreover, as in Embodiment 1, the width of the first support member 3a is larger than the width of the second support member 3b in the present embodiment. Consequently, as shown in FIG. 10A, the first support member 3a protrudes toward the center of the touch screen panel 2. Protrusion of the first support member 3a reduces the space in which to fix the vibration mechanism 4 to the touch screen panel 2. In that case, the vibration source of the vibration mechanism 4 may be placed at a position away from the touch screen panel 2, and the vibration propagating member 4a may be placed in contact with the touch screen panel 2, whereby the vibration mechanism can be efficiently disposed in scarce space.

Note that the vibration mechanism 4 may be a cantilever as shown in FIG. 10C. The vibration mechanism 4 shown in FIG. 10C is fixed to the touch screen panel 2 at a section 4a which is in contact with the touch screen panel 2. On the other hand, a section 4*b* which is not in contact with the touch screen panel 2 is not in contact with any other member. Such a construction can also provide enhanced freedom in positioning the vibration mechanism 4.

Moreover, the vibration mechanism 4 may have a construction as shown in FIG. 10D. The vibration mechanism 4 is fixed to the base 1. When vibrating, the vibration mechanism 4 applies vibration to the touch screen panel 2 as the section 4*a* in contact with the touch screen panel 2 collides with the touch screen panel 2. Such a construction can also provide enhanced freedom in positioning the vibration mechanism 4.

Effects

As described above, by allowing the vibration mechanism 4 to be separately disposed as a vibration propagating member and a vibration source, the freedom in positioning the vibration mechanism 4 can be enhanced.

Moreover, in any of the above constructions, via the touch screen panel 2, vibration is easy to propagate to the vicinity of the first support member 3*a* being relatively close to the section 4*a* of the vibration mechanism 4, which is in contact with the touch screen panel 2. On the other hand, the second support member 3*b* is farther away from the section 4*a* of the vibration mechanism 4, which is in contact with the touch screen panel 2, than is the first support member 3*a*; therefore, the second support member 3*b* suffers from a large decay during propagation through the touch screen panel 2. This would make the vibration propagating to the vicinity of the second support member 3*b* smaller than the vibration propagating to the vicinity of the first support member 3*a*. Accordingly, in the present embodiment, as described above, the rigidity of the first support member 3*a* is increased over the rigidity of the second support member 3*b*. Since the rigidity of the first support member 3*a* (to which vibration is easy to propagate) is increased, the vibration becomes relatively small in the portion of the touch screen panel 2 near the first support member 3*a*. On the other hand, since the rigidity of the second support member 3*b* (to which vibration is less likely to propagate) is reduced, the vibration in the portion of the touch screen panel 2 near the second support member 3*b* is relatively large compared to the conventional level. Therefore, fluctuations in the magnitude of vibration depending on the position on the touch screen panel 2 can be reduced from the conventional level.

Embodiment 8

Hereinafter, with reference to the figures, an electronic device 18 according to Embodiment 8 will be described. In Embodiments 1 to 7, the rigidity of the first support members 3*a* is increased over the second support members 3*b* in order to alleviate inconsistencies in tactile sensation depending on the touched position. However, the inventors have found the possibility that, if the entire support structure 3 has a high rigidity, the overall vibration of the touch screen panel 2 may be so small that appropriate tactile sensations cannot be presented to the operator. In such cases, by decreasing the rigidity of the entire support structure 3, the overall vibration of the touch screen panel 2 can be increased, whereby satisfactory tactile sensations can be presented to the operator of the electronic device.

On the other hand, when the support structure 3 and the touch screen panel 2 adhere to each other, their adhesive strength depends on the area of adhesion between the support structure 3 and the touch screen panel 2. Therefore, any alteration of the shape of the support structure 3 that is made in order to reduce the rigidity of the support structure 3 may result in a possibility that the adhesive strength between the support structure 3 and the touch screen panel 2 may decrease. For example, if the width W of the support structure 3 is decreased in order to reduce the rigidity of the support structure 3, then the area of adhesion between the support structure 3 and the touch screen panel 2 will become smaller, thus lowering the adhesive strength between the support structure 3 and the touch screen panel 2. The same is also true of the adhesive strength between the support structure 3 and the base 1.

A support structure 3' according to the present embodiment does not include any first support members or second support members having differing rigidities, and thus the entire support structure 3' has the same rigidity throughout. Irrespective of the position in the support structure 3', the entire support structure has a cross section perpendicular to the longitudinal direction with a recess and/or a void. Since the support structure 3' has a cross section with a recess and/or a void, the rigidity of the entire support structure 3' is decreased without reducing the area of adhesion between the support structure and the touch screen panel or the base.

Construction

Figure 11A:
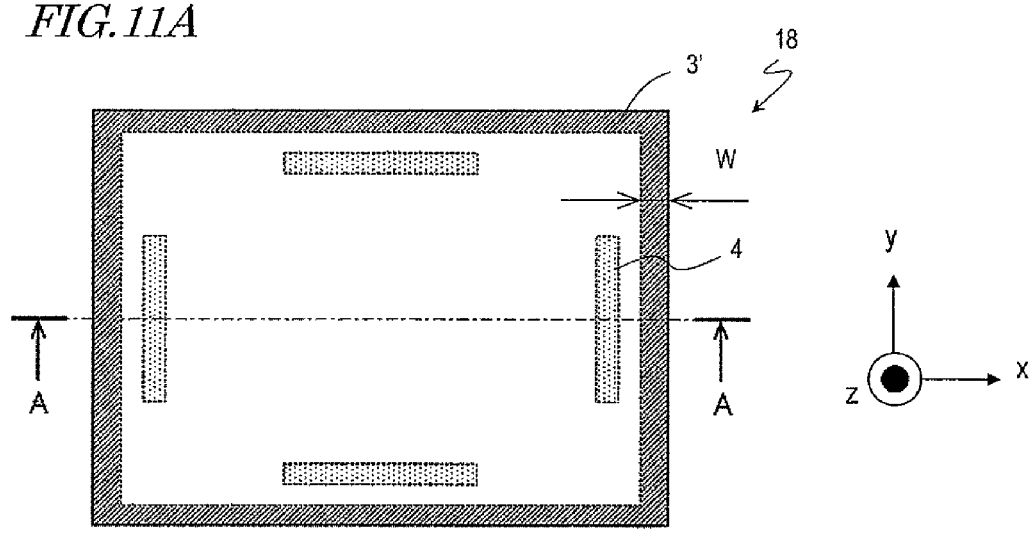
FIG. 11A is an upper plan view of an electronic device according to Embodiment 8.
Figure 11B:
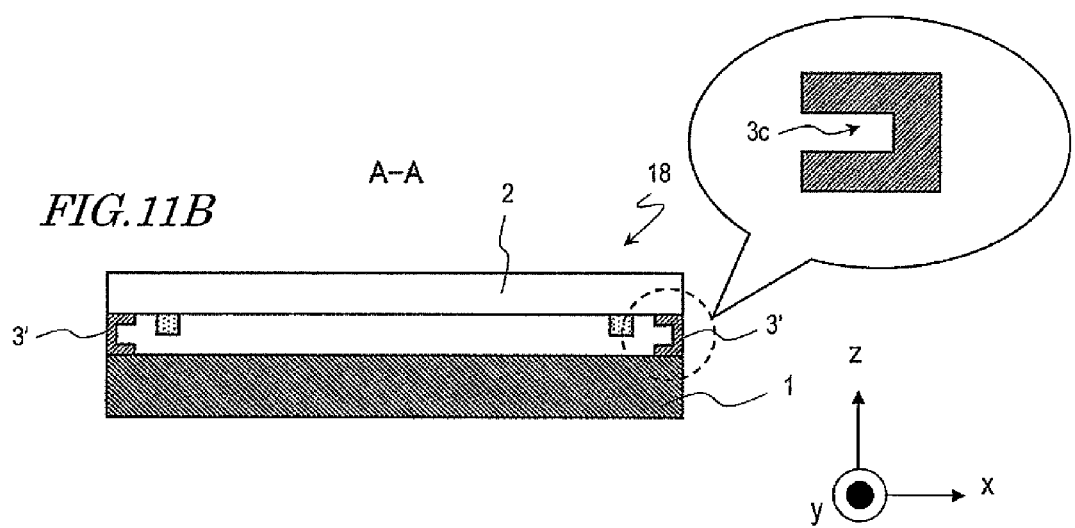
FIG. 11B is a cross-sectional view taken along A-A in FIG. 11A.
Figure 12A:
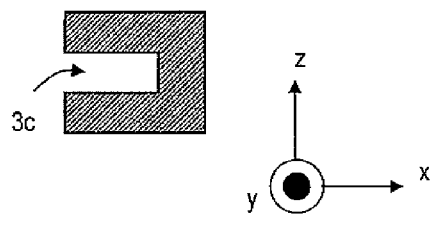
FIGS. 12A to 12C are diagrams showing exemplary cross sections of a support structure 3 according to Embodiment 8.
Figure 12B:
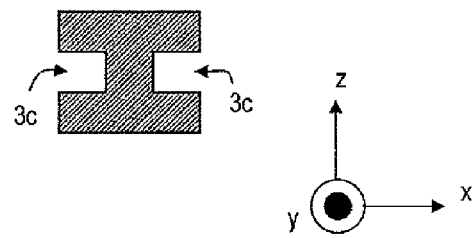
Figure 12C:
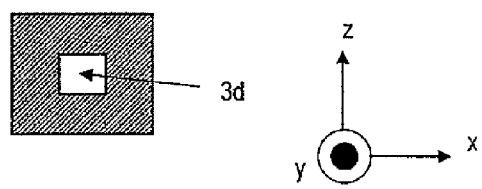
Figure 12D:
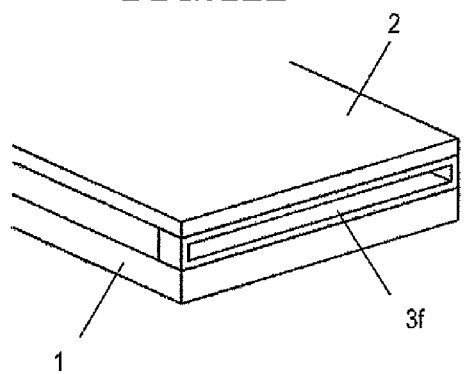
FIGS. 12D and 12E are perspective views showing examples of the support structure 3.
Figure 12E:
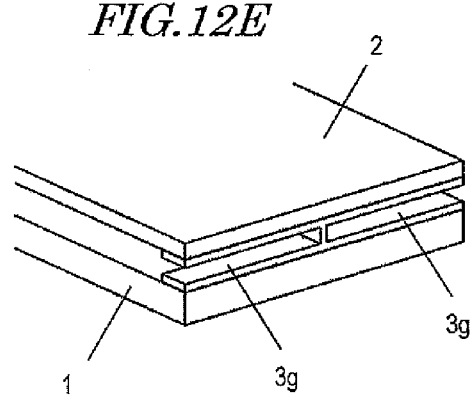

FIG. 11A is an upper plan view of the electronic device 18. FIG. 11B is a cross-sectional view of the electronic device 18 taken along A-A. FIGS. 12A to 12C are exemplary cross-sectional views of the support structure 3'. FIGS. 12D and 12E are exemplary perspective views of the support structure 3'.

As shown in FIG. 11A, in the present embodiment, the support structure 3' does not include any first support members or second support members having differing rigidities, and thus the entire support structure 3' has the same rigidity throughout, unlike in Embodiment 1.

In a cross section perpendicular to the longitudinal direction, the support structure 3' has a recess or a void at a position away from the portion which is in contact with the touch screen panel 2, at least partly along the longitudinal direction. As shown in FIG. 11B, specifically, the cross section of the support structure 3' has a recess 3*c* in a side adjacent to the side which is in contact with the touch screen panel 2. In other words, the support structure 3' has a cross section with a inversed "C" shape. Thus, the support structure 3' has a groove extending along the longitudinal direction in one face that is adjacent to the face which is in contact with the touch screen panel 2. With this construction, the rigidity of the entire support structure 3' can be decreased without reducing the area of adhesion between the support structure 3' and the touch screen panel 2 or the base 1.

Note that the cross-sectional shape of the support structure 3' is not limited to the inversed "C" shape as shown in FIG. 11B. For example, as shown in FIG. 12B, the cross section of support structure 3' may have a recess 3*c* in each of the two sides that are adjacent to the side which is in contact with the touch screen panel 2. When having such a cross section, the support structure 3' has a groove extending along the longitudinal direction in each of the two faces that are adjacent to the face which is in contact with the touch screen panel 2. Alternatively, as shown in FIG. 12C, the cross section of the support structure 3' may have a void 3*d*. As a result, the support structure 3' has a hollow rectangular shaped cross section, and has a cavity extending along the longitudinal direction in its interior.

Alternatively, as shown in FIG. 12D, the support structure 3' may have a throughhole 3f in a side face. Alternatively, as shown in FIG. 12E, the support structure 3' may have a recess 3g in a side face. Although not shown, the support structure 3' may have both of a recess and a void, or have a plurality of recesses and/or voids. In other words, it suffices if the rigidity of the entire support structure 3' is decreased than when there are no recesses and/or voids.

Effects

In the present embodiment, as described above, a shape having a recess and/or a void is adopted for the support structure 3', whereby the rigidity of the entire support structure 3' is decreased without reducing the area of adhesion between the support structure 3' and the touch screen panel 2 or the base 1. Therefore, without lowering the adhesive strength between the support structure 3' and the touch screen panel 2 or the base 1, a vibration which is larger than conventional can be applied to the touch screen panel 2.

Other Embodiments

In Embodiments 1 to 8 above, each vibration mechanism 4 is illustrated to be near a substantial midpoint of each side of the touch screen panel 2, but the position to dispose the vibration mechanism 4 is not limited thereto. A vibration mechanism 4 may be disposed near each corner of the touch screen panel 2, or between a corner and a midpoint of each side of the touch screen panel 2.

Although the touch screen panel 2 is illustrated as having a rectangular shape, this is not a limitation. The shape of the touch screen panel 2 may be a polygon, a circle, or an ellipse.

Although Embodiment 5 illustrates the first contacting region 3ac and the second contacting region 3bc to be in uniform placement, this is not a limitation. The positioning of the first support members 3a and the second support members 3b may be arbitrary. In other words, the lengths of the first contacting region 3ac and second contacting region 3bc and the first non-contacting region 3au and second non-contacting region 3bu along their longitudinal directions, and the positioning thereof, may be freely set so long as eq. (1) is satisfied.

Figure 13A:
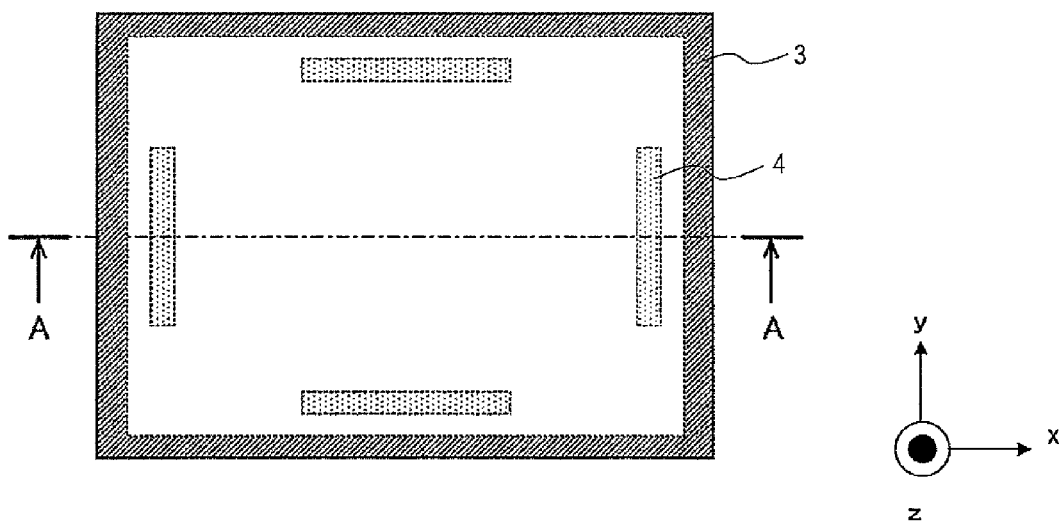
FIG. 13A is an upper plan view of an electronic device according to another embodiment.
Figure 13B:
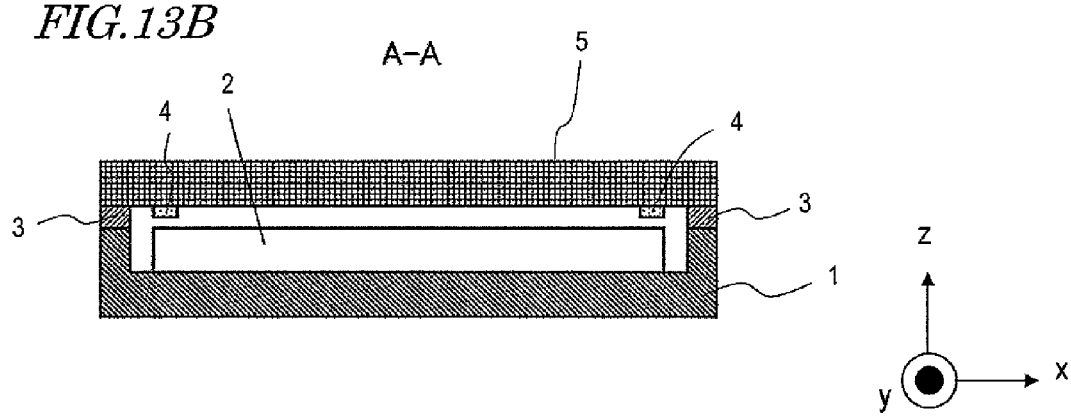
FIG. 13B is a cross-sectional view taken along A-A in FIG. 13A.

Although Embodiments 1 to 8 illustrate that the support structure 3 and the vibration mechanisms 4 are attached to the touch screen panel 2, this is not a limitation. For example, as shown in FIGS. 13A and 13B, in the case where a protection panel 5 is provided above a touch screen panel 2 (a positive direction of the Z axis) with a space therebetween, the support structure 3 and the vibration mechanisms 4 may be attached to the protection panel 5. In the case, the touch screen panel 2 can detect a touching of the operator which is made via a finger, a stylus, etc., and/or the touched position on the protection panel 5 by using an electrostatic method, an optical method as a detection method for the touch screen panel 2. In summary, the support structure 3 and the vibration mechanisms 4 may be attached to any member that the operator may touch upon.

Figure 14A:
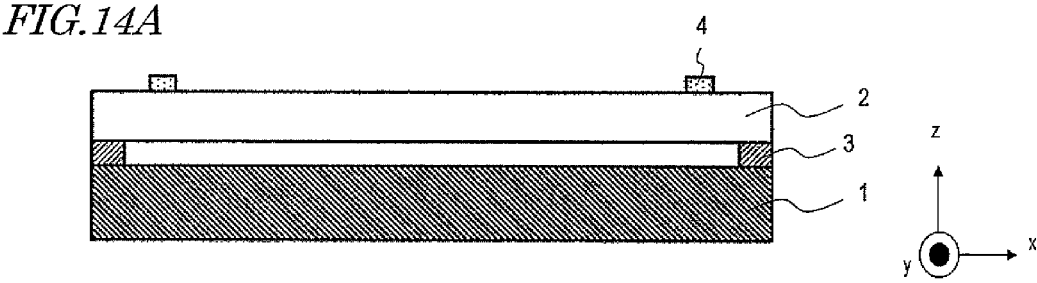
FIGS. 14A to 14E are diagrams showing exemplary cross sections of electronic devices according to other embodiments.
Figure 14B:
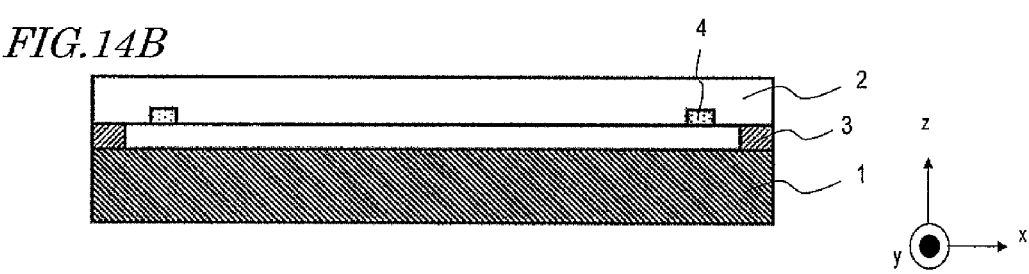
Figure 14C:
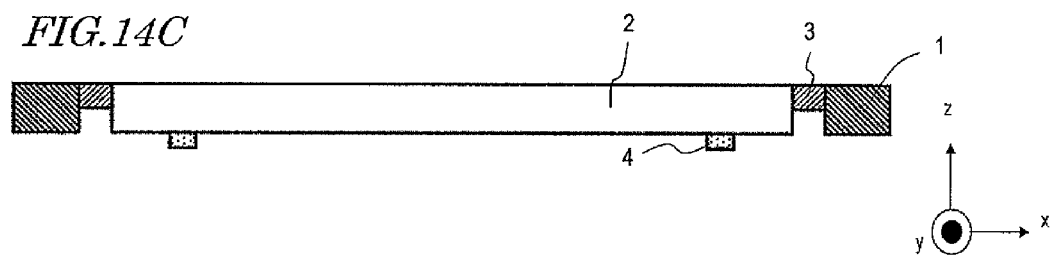

Although Embodiments 1 to 8 illustrate the support structure 3 and the vibration mechanisms 4 to be disposed on the same face of the touch screen panel 2, this is not a limitation. For example, as shown in FIG. 14A, the support structure 3 and the vibration mechanisms 4 may be disposed on opposite faces of the touch screen panel 2. Alternatively, as shown in FIG. 14B, the vibration mechanisms 4 may be embedded in the touch screen panel 2. As shown in FIG. 14C, the support structure 3 may be disposed on side faces of the touch screen panel 2.

Figure 14D:
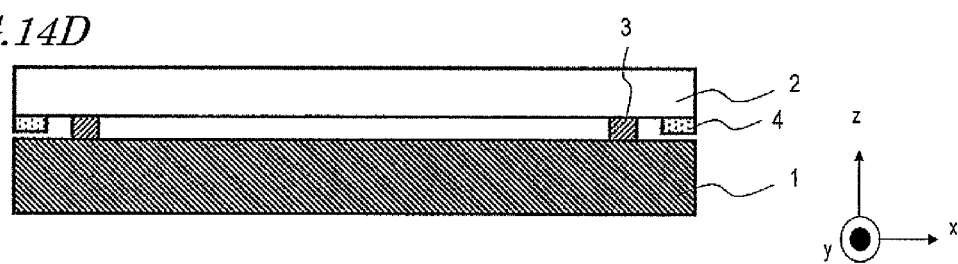
Figure 14E:
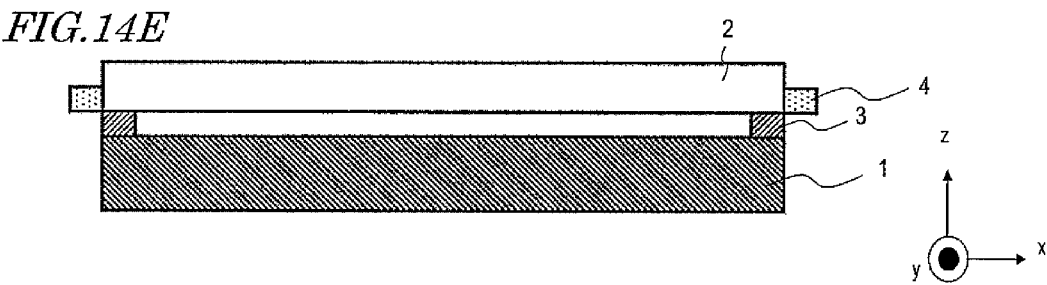

Although Embodiments 1 to 8 illustrate the vibration mechanisms 4 to be disposed inside the support structure 3, this is not a limitation. For example, as shown in FIG. 14D, the vibration mechanisms 4 may be disposed outside the support structure 3. As shown in FIG. 14E, the vibration mechanisms 4 may be disposed on side faces of the touch screen panel 2.

Figure 15A:
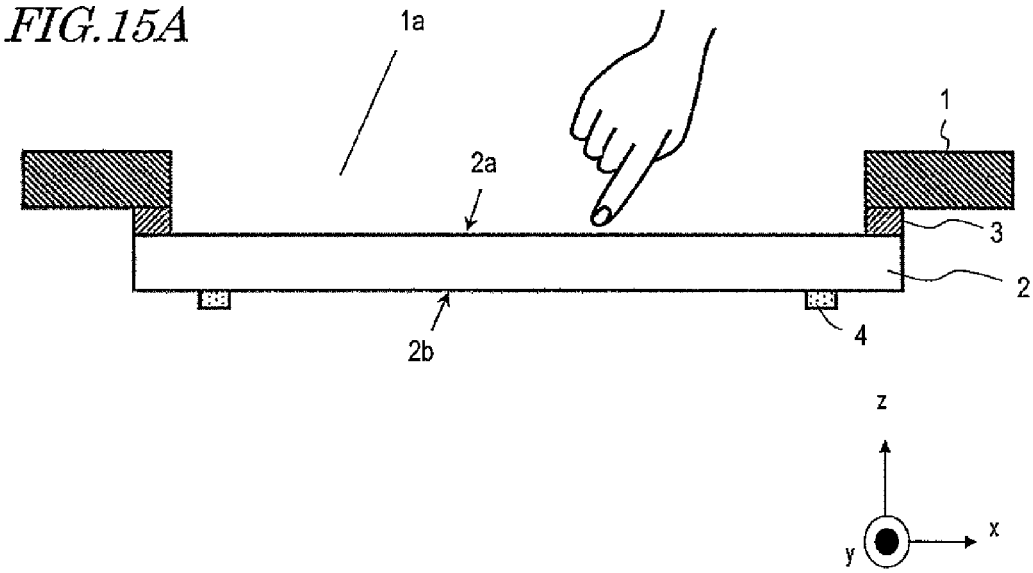
FIGS. 15A and 15B are diagrams showing exemplary cross sections of electronic devices according to other embodiments.
Figure 15B:
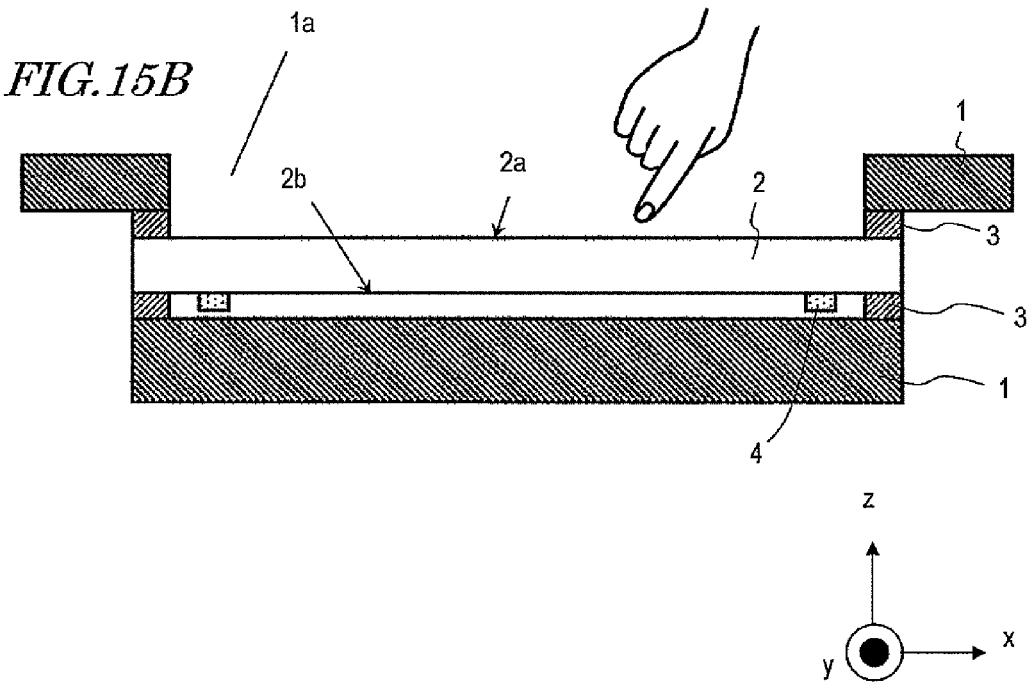

Although Embodiments 1 to 8 illustrate the base 1 to be disposed on the rear face 2b of the touch screen panel, this is not a limitation. For example, as shown in FIG. 15A, the base 1 may be disposed on the touch surface 2a side. In this case, in order to leave a path for the operator to touch the touch screen panel 2, the base 1 needs to have an opening 1a. Alternatively, as shown in FIG. 15B, bases 1 may be disposed on both of the touch surface 2a side and the rear face 2b side of the touch screen panel.

Embodiments 1 to 8 illustrate that the support structure 3 between the touch screen panel and the base 1 allows the space 7 to be left. However, the space 7 may be filled with a material which does not hinder the vibration of the touch screen panel 2, for example.

Moreover, the respective constructions of Embodiments 1 to 8 may be combined as necessary.

The electronic device disclosed herein is suitably used for a variety of electronic devices having touch screen panels. For example, it is suitably used as an input device of a mobile information terminal device, a computer display, a car navigation apparatus, an ATM, a ticket vending machine, or the like.

While the present invention has been described with respect to preferred embodiments thereof, it will be apparent to those skilled in the art that the disclosed invention may be modified in numerous ways and may assume many embodiments other than those specifically described above. Accordingly, it is intended by the appended claims to cover all modifications of the invention that fall within the true spirit and scope of the invention.

This application is based on Japanese Patent Applications No. 2011-149818 filed on Jul. 6, 2011 and No. 2012-141711 filed on Jun. 25, 2012, the entire contents of which are hereby incorporated by reference.

What is claimed is:
1. An electronic device comprising:
   a touch screen panel;
   a support structure having first support members and a second support member, the first support members and the second support member being in contact with the touch screen panel, the first support members being in contact with the touch screen panel at different positions than the second support member, to support the touch screen panel at a periphery of the touch screen panel;
   a base being in contact with the first support members and the second support member to support the touch screen panel via the support structure, the first support members and the second support member respectively interposed between the base and the touch screen panel; and
   vibration mechanisms for vibrating the touch screen panel, wherein, at least two of the vibration mechanisms are each located closer to a respective one of the first support members than to the second support member, the first support members having a rigidity which is greater than a rigidity of the second support member, and
the first support members connect the touch screen panel and the base directly.

2. The electronic device of claim 1, wherein,
in a direction which is parallel to a face of the touch screen panel that is in contact with the support structure, the direction being perpendicular to a longitudinal direction of the support structure, the first support members have a width which is greater than a width of the second support member.

3. The electronic device of claim 1, wherein a cross-sectional shape of the first support members taken perpendicular to a longitudinal direction of the first support members is different from a cross-sectional shape of the second support member taken perpendicular to a longitudinal direction of the second support member.

4. The electronic device of claim 1, wherein, in a direction which is perpendicular to a face of the touch screen panel that is in contact with the support structure, the first support members have a thickness which is smaller than a thickness of the second support member.

5. The electronic device of claim 1, wherein the first support members and the second support member are composed of a first material and a second material, respectively, the first material having a rigidity which is greater than a rigidity of the second material.

6. The electronic device of claim 1, wherein,
the respective first support members have
at least one first non-contacting region lacking contact with the touch screen panel or the base, and
a plurality of first contacting regions which are spaced apart by the at least one first non-contacting region along a longitudinal direction of the respective first support members, the first contacting regions being in contact with the touch screen panel;
the second support member has
at least one second non-contacting region lacking contact with the touch screen panel or the base, and
a plurality of second contacting regions spaced apart by the at least one second non-contacting region along a longitudinal direction of the second support member, the second contacting regions being in contact with the touch screen panel; and $L1/L2 > L3/L4$ is satisfied, where L1 is a total length of the plurality of first contacting regions along the longitudinal direction of the respective first support members; L2 is a length or a total length of the at least one first non-contacting region along the longitudinal direction of the respective first support members;
L3 is a total length of the plurality of second contacting regions along the longitudinal direction of the second support member; and L4 is a length or a total length of the at least one second non-contacting region along the longitudinal direction of the second support member.

7. The electronic device of claim 1, wherein,
the vibration mechanism includes
a vibration source for generating vibration, and
a vibration propagating member for propagating the vibration generated by the vibration source to the touch screen panel; and
the vibration source is at a position which is more distant from the touch screen panel than is the vibration propagating member.

8. The electronic device of claim 1, wherein
the touch screen panel has a first principal face, a second principal face, and a side face located between the first principal face and the second principal face; and
at the periphery of the touch screen panel, the first support members and the second support member are each in contact with the first principal face, the side face, and the second principal face of the touch screen panel.

9. The electronic device of claim 1, further comprising a display device.

10. The electronic device of claim 1, further comprising a control section for, as an operator designates an arbitrary position on an input plane of the touch screen panel by touching, receiving a signal indicative of the input from the touch screen panel, and outputting a driving signal to the vibration mechanism based on the signal.

11. The electronic device of claim 1, wherein,
the second support member does not connect the touch screen panel and the base directly.

12. The electronic device according to claim 1, wherein the first support members and the second support member are respectively configured to have a rigidity and a location in relation to the vibration mechanisms for effecting a reduction in the fluctuations in the magnitude of vibration on the touch screen panel.

13. The electronic device according to claim 1, wherein the first support members and the second support member are made from the same material.

14. The electronic device according to claim 1, wherein the vibration mechanism is mounted to the touch screen panel.

15. The electronic device of claim 1, wherein the first support members are disposed so as to be apart from the vibration mechanisms.

16. The electronic device of claim 1, wherein the vibration mechanisms are disposed on the touchscreen panel directly.

17. An electronic device comprising:
a touch screen panel;
a support structure having a first support member and a second support member, the first support member and the second support member being in contact with the touch screen panel, the first support member being in contact with the touch screen panel at a different position than the second support member, to support the touch screen panel at a periphery of the touch screen panel;
a base being in contact with the first support member and the second support member to support the touch screen panel via the support structure, the first support member and the second support member respectively interposed between the base and the touch screen panel; and
a vibration mechanism for vibrating the touch screen panel, wherein,
the vibration mechanism is located closer to the first support member than to the second support member,
the first support member has a rigidity which is greater than a rigidity of the second support member, and
the first support member connects the touch screen panel and the base directly.

18. An electronic device comprising:
a touch screen panel;
a support structure having one or more first support members and having a second support member, the one or more first support members and the second support member being in contact with the touch screen panel, the one or more first support members being in contact with the touch screen panel at different positions than the second support member, to support the touch screen panel at a periphery of the touch screen panel;

a base being in contact with the one or more first support members and the second support member to support the touch screen panel via the support structure, the one or more first support members and the second support member respectively interposed between the base and the touch screen panel; and one or more vibration mechanisms for vibrating the touch screen panel, wherein, the one or more first support members have a rigidity that is greater than a rigidity of the second support member, when the electronic device includes only one first support member and only one vibration mechanism, the only one vibration mechanism is located closer to the only one first support member than to the second support member, and the first support member connects the touch screen panel and the base directly, and when the electronic device includes at least two first support members and at least two vibration mechanisms, the at least two vibration mechanisms are each located closer to a respective one of the at least two first support members than to the second support member, and the at least two first support members connect the touch screen panel and the base directly.

* * * * *